Dec. 17, 1968  M. A. CHAVANNES ET AL  3,416,984
METHOD AND APPARATUS FOR MAKING CELLULAR
MATERIAL FROM THERMOPLASTIC SHEETS
Original Filed Nov. 19, 1963
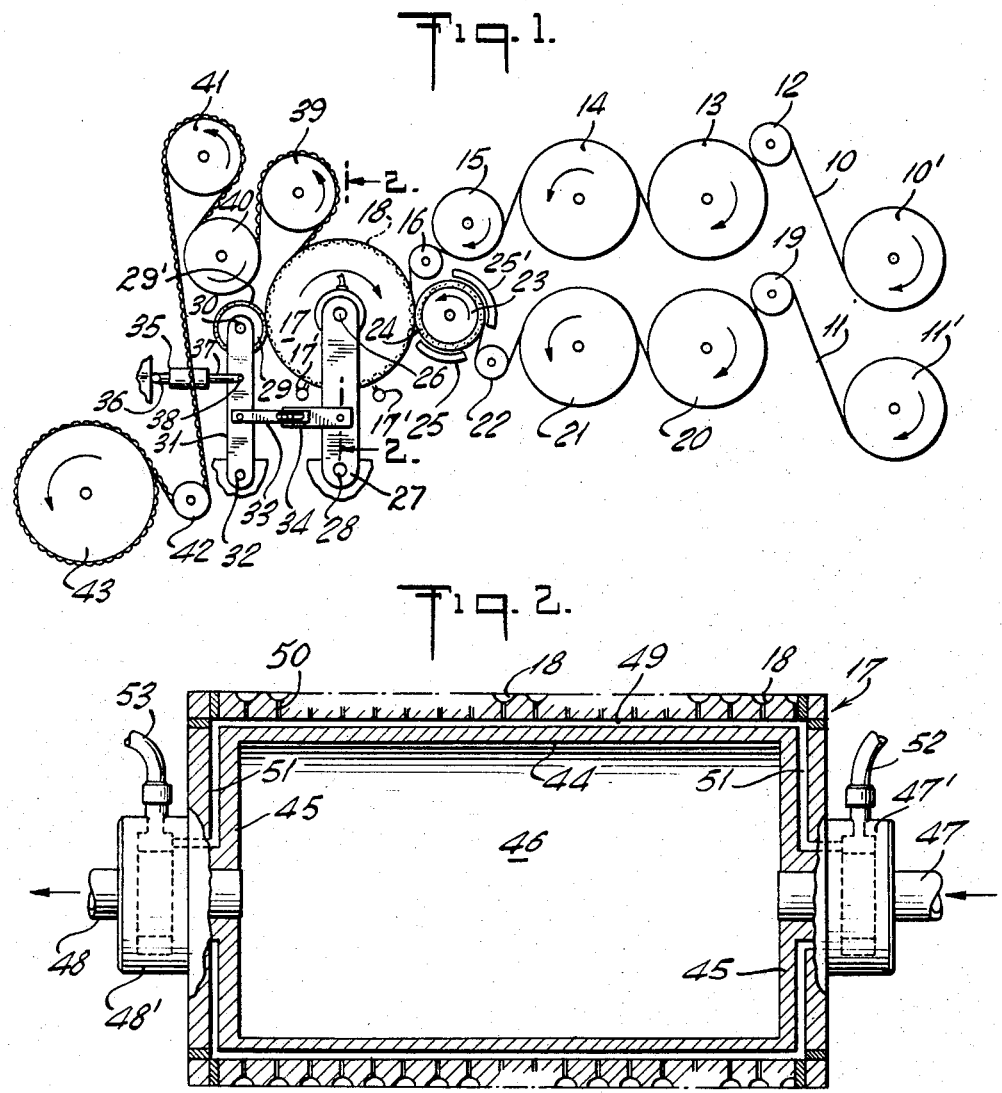
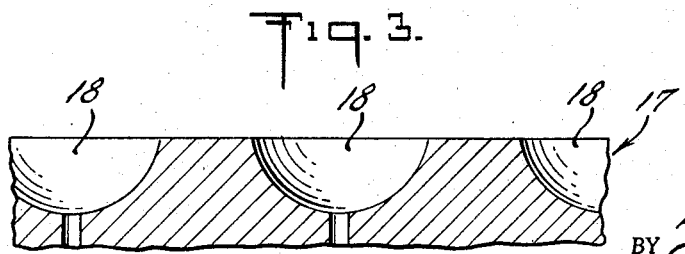
INVENTOR.
MARC A. CHAVANNES
ALFRED W. FIELDING
BY
ATTORNEY

United States Patent Office 3,416,984
Patented Dec. 17, 1968

3,416,984
METHOD AND APPARATUS FOR MAKING CELLULAR MATERIAL FROM THERMOPLASTIC SHEETS
Marc A. Chavannes, New York, N.Y., and Alfred W. Fielding, Wayne, N.J., assignors to Sealed Air Corporation, Hawthorne, N.J.
Continuation of abandoned application 324,718, Nov. 19, 1963. This application Nov. 13, 1967, Ser. No. 682,687
10 Claims. (Cl. 156—209)

ABSTRACT OF THE DISCLOSURE

Method and apparatus for manufacturing cellular plastic material, including improved method for heating the plastic sheets for embossing and laminating and apparatus including an improved resilient laminating roller and mounting means for the laminating and embossing rollers.

---

This application is a continuation of United States application for patent by Marc A. Chavannes and Alfred W. Fielding, Ser. No. 324,718, filed Nov. 19, 1963, now abandoned, entitled, Method and Apparatus for Making Cellular Material.

The invention relates to cellular material for cushioning, insulating and other purposes, and, more specifically, concerns a novel and improved method and apparatus for manufacturing cellular material from sheet materials, such as plastic film and the like having thermoplastic characteristics.

In the fabrication of cellular material from sheets of plastic wherein one sheet is heated and then embossed and a second heated sheet is applied to the first sheet while on the embossing roller to seal the embossments and form air-tight cells, it is important that the two layers are effectively fused one to the other to permanently seal each of the individual embossments. This invention has as one of its objects an improved method and apparatus for heating and maintaining the temperature of the sheets or films to insure effective fusion therebetween. In this way, relatively high speeds of operation can be maintained and good fusion of the two films effected without the danger of damaging or distorting the films even when utilizing films of the order of 1 mil in thickness.

Another object of the invention resides in the provision of a novel and improved method for fusing films, having thermoplastic properties, one to the other at relatively high speeds.

Still another objects of the invention resides in a novel and improved method for controlling film temperatures in the fabrication of cushioning material.

A still further object of the invention resides in the provision of novel and improved apparatus for manufacturing cellular cushioning material.

A still further object of the invention resides in the provision of a novel and improved embossing roller and means for adjusting the pressure between the embossing cylinder and the laminating roller to provide an effective seal between the sheets of plastic material being processed.

The above and other objects and advantages of the invention will become more apparent from the following description and accompanying drawings forming part of this application.

In the drawings:

FIGURE 1 is a diagrammatic view of apparatus for manufacturing cushioning material in accordance with the invention.

FIGURE 2 is a cross-sectional view of the embossing cylinder of FIGURE 1 and taken along the line 2—2 thereof.

FIGURE 3 is an enlarged fragmentary view of a portion of the surface of the cylinder shown in FIGURE 2.

Broadly, the manufacture of cellular material for cushioning, insulating and other purposes from plastic sheets having thermoplastic properties involves the heating of a first sheet and feeding it onto an embossing cylinder to form a plurality of discrete embossments. While the first sheet is on the embossing cylinder, a second heated sheet is fed into overlying relationship and fused to the salient portions of the first sheet. In effecting good fusion between the two sheets, the temperature of the contacting faces of the sheets, the laminating pressure, and the time during which the sheets are subjected to the laminating pressure are significant and interdependent factors. These factors are also affected by the characteristics of the plastic sheets being laminated as well as the thickness of the sheets themselves.

In the lamination of plastic sheets to provide a cellular material as described above, the temperature of at least the contacting surfaces of the two sheets should be at the fusion temperature of the material when the surfaces are first brought into contact one with the other. Another factor to be considered, particularly when handling thin films, is the tendency of the film to adhere to the pressure or nip roller during the laminating process for in some cases substantial laminating pressure is utilized.

Still another factor which influences the operating temperatures and pressures of the process is the speed at which the films are moved through the apparatus. In practice, thin films of the order of 1–4 mils are treated at higher speeds than the heavier films notwithstanding the fragility of the thin films. With high speed processing, it has been found that improved control of film temperature is attained and this minimizes the chance of film damage or distortion. While the speeds at which the films are processed can be varied over relatively wide ranges, the temperatures of the heating means for the films are adjusted in proportion to the speed so that the films will have the desired temperatures for embossing and laminating. The laminating pressure also affects the quality of the seal between the two sheets or films and the pressure is generally increased with the lowering of the temperature of the mating surfaces of the sheets or films. This invention provides both an improved method and apparatus for readily attaining the desired temperatures of the sheets or films to permit both embossment and lamination. In addition, an improved embossing procedure and embossing cylinder construction and mount has been provided which minimizes the chance of film damage and at the same time facilitates the attainment of good fusion.

The improved method for heating the two films in accordance with the invention involves heating the film to be embossed to a temperature just below the fusion temperature but high enough to insure permanent embossment of the film. The outer surface of the film when on the embossing role is at about the fusing temperature. The laminating film which is applied to the embossed film while on the embossing roll has at least the surface which is to contact the embossed film at a temperature above the fusion temperature so that when the laminating film is applied to the embossed film the contacting surfaces will equalize at a temperature at or above the fusion temperature. Under these conditions, the film being embossed will not be easily damaged by the embossing process since it is at a lower temperature than the laminating film and the danger of perforating embossments by vacuum is avoided. Furthermore, since the laminating film is not embossed it can be safely heated to a sufficiently high temperature to insure good fusion. To effect good fusion, at least a portion of the surface molecules must be melted on the contacting surfaces of each film and it is not essential that all molecules on the surfaces of both films be melted.

It is to be understood that a variety of materials may be used in making cellular material in accordance with the invention. The materials should have good gas impervious characteristics and the sheet to be embossed must be sufficiently elastic when treated to facilitate permanent embossment and should, of course, be heat sealable. The laminating sheet need not be elastic but must be heat sealable or have a heat sealable coating or impregnation. For instance, laminating materials may include coated cellophane, foils, papers, and the like.

Referring now to FIGURE 1, the plastic films or sheets used in the fabrication of a cushioning material in accordance with the invention are generally denoted by the numerals 10 and 11 carried on rolls 10' and 11' and fed continuously through the apparatus. The film 10 is fed over a first roller 12, thence over a series of heating rollers 13, 14, 15 and 16. By way of example, let it be assumed that the sheets 10 and 11 each comprise a copolymer of vinyl chloride and vinyl acetate. This material has a temperature characteristic such that permanent embossing can be effected at about 300° F. while portions of the surface molecular layers will start to melt about 310° F., and the entire surface will be melted at about 340° F. Inasmuch as a high speed is used in processing of the material as will be described, it is possible to heat the body of the material to be embossed to a temperature of about 300° F. while at the same time one surface thereof can be raised to a temperature above 300° F. As will be shown, this situation maintains for an extremely short period of time and because of the nature of plastic materials this temperature differential can be maintained until lamination is effected.

Raising the temperature of the film 10 to an embossing temperature of say 300° F. in accordance with the selected sample is accomplished essentially by the rollers 13–15 with each roller successively raising the temperature of the film. With thin films which are usually processed at speeds in excess of 200 feet per minute, the temperature of the rollers must necessarily be above the temperature to be attainable by the film in passing over that roller. In practice, it has been found desirable to impart sufficient heat to the film in passing over the roller 13 to attain a temperature of the order of 200° F. to 250° F., while the film upon leaving the roller 15 should have attained a temperature of 300° F. The roller 16 is heated to a temperature above the fusing temperature and while it does not contribute additional heat to the body of the film, it raises the temperature of the surface contacting that roller to about but not exceeding the fusion temperature. In selecting the temperatures to which the rollers are to be heated, the speed of travel of the film is first determined and then the roller temperatures are selected so that the desired amount of heat will be imparted to the film during the time in which the film is in contact with the roller. For instance, at slower speeds, the roller temperatures would be lower than at higher speeds. Furthermore, with heavier films, the temperatures can be higher since more heat must be imparted to the thicker films to raise them to the desired temperature.

While the heating rollers 13–16 are illustrated in the embodiment of the invention shown in FIGURE 1, it is possible to utilize a smaller number of rollers or even a single heating roller of relatively large diameter to effect the same result. It is also possible to raise the film temperature through the utilization of radiant heating devices, such as electric heaters and the like, directed on to the web.

The heated film 10 is then fed on to the embossing cylinder 17 which, in the instant embodiment of the invention, is a temperature controlled cylinder formed of a high heat conductive material. While this cylinder will be described in detail in connection with FIGURE 2, it does include a plurality of depressions 18 distributed throughout the surface thereof. The depressions 18 are connected by minute orifices to a vacuum system for the purpose of embossing the sheet 10 on contact with the cylinder. As will be shown, the cylinder 17 is further provided with means for maintaining the cylinder at a selected temperature throughout the process. The temperature of the cylinder 17 should be maintained well below the embossing temperature of the film. In the case of an embossing temperature of 300° F., the temperature of the cylinder 17 must be low enough to reduce the temperature of that side of the film contacting the roller 17 to about 250° F.–275° F., or even lower by the time the completed material leaves the embossing cylinder.

The desirable temperature of the cylinder 17 will, of course, vary in accordance with the thickness of the film 10 and at the rate at which it is fed through the apparatus. With higher speeds, the temperature of the cylinder 17 must be lower in order to prevent accumulation of too much heat in the cylinder. With thick films, the cylinder must be maintained at lower temperatures than with thinner films. It is important, however, that the temperature of cylinder 17 during operation of the equipment be such that the surface temperature will be just low enough to cool the surface of the film contacting the cylinder to a temperature somewhat below the embossing temperature of the film and yet high enough to prevent cooling of the outer side of the film before lamination is effected.

The utilization of a temperature controlled embossing cylinder materially reduces the possibility of damage to the embossed film by immediately initiating cooling of the embossed portions of the film and thereby reducing the possibility of formation of holes in the embossments by the minute vacuum orifices in each of the depressions 18. A further advantage is gained by heating the film to be embossed in such a manner that the outer surface of that film when fed on to the embossing cylinder is at a temperature not exceeding the fusion temperature and the laminating film which is not subjected to the mechanical stresses of embossing is heated to a temperature above the fusion temperature. In this way, when the two films meet, heat will be transferred from the laminating film to the embossed film so that the contacting surfaces of both films will be at or above the fusion temperature.

The second film 11 is processed simultaneously with the film 10. the film 11 passes over a series of rollers 19 through 23, with the rollers 20 through 22 being heated at approximately the same temperatures as the rollers 13 through 16. The roller 23, which may be termed the pressure or nip roller, applies the heated film to the embossing cylinder 17. When operating with thin films, the roller 23 must have a heated surface in order to prevent cooling of the film before it is laminated with the film 10. Furthermore, it has been found desirable to utilize a resilient surface 24 on the roller 23 to obtain substantially uniform pressure between the roller 23 and the cylinder 17 and thereby effect uniform seal throughout the entire width of the two films. To attain these ends, the roller 23 is preferably covered with a layer of silicone rubber or other material having similar surface characteristics which may be termed the "release" characteristic. It has been found that heated plastics tend to adhere or fuse to surfaces which are brought in contact with them and the higher the temperature of the plastic, the more readily will the adherence be effected. With materials such as silicone rubber, it has been found that heated plastic materials at or even above their fusion temperatures will not adhere. As pointed out above, the surface of the silicone rubber must be at or above the fusion temperature of the film 11 which, with certain plastics, may be well above 300° F. When utilizing a silicone coating these high temperatures may damage the bond between the coating and the metal roller. To avoid this difficulty, the roller 23 is cooled by the circulation of a coolant therethrough to maintain the bond temperature at or below 125° F. The surface temperature of the roller is raised by means of a radiant heater 25.

When using heavier films as the film 11, a radiant heater 25' may be employed instead of or in addition to the heater 25. If heater 25' is not used and the roller 23 is cooled, some temperature gradient is created through the film 11 since the outer surface will be raised at least to its fusion temperature. When both heaters 25 and 25' are used, heater 25 may operate to maintain the surface temperature of the coating or surface 24 on roller 23 in the vicinity of the fusion temperature or possibly slightly below the fusion temperature while the heater 25' raises the outer surface of the film passing over the roller 23 to a temperature at or above the fusion temperature of the plastic.

In the case of most plastics, it is desirable to maintain a reasonable amount of pressure between the roller 23 and the embossing cylinder 17. One procedure for the control of pressure at the nip between roller 23 and the cylinder 17 is to fixedly mount the roller 23 and movably mount the cylinder 17. For this purpose, one end of the cylinder 17 is pivotally mounted at 26 to the upper end of a link 27, with the lower end of the link 27 being pivoted at 28 to a stationary frame member. A second corresponding link not shown supports the other end of the cylinder. In the instant embodiment of the invention, a pressure roller 29 having a resilient coating 29' similar to that on roller 23 is rotatably carried at the upper ends of a pair of links of which only one link 31 is shown. The lower ends of the links are pivoted at 32 to a frame or other fixed element of the apparatus. The links 27 and 31 are connected by a pair of slidably engaged links 33 and 34 and a fluid-actuated piston 35 is connected at one end 36 to a fixed frame element, while the other end 37 is pivoted at 38 to the link 31. Corresponding connecting links and a piston not shown are utilized on the opposite end of roller 29 to provide a balanced operation. With this arrangement, as the pistons 35 are actuated, they will move the links 31 to the right as shown in FIGURE 1 and urge the roller 29 against the cylinder 17. At this point, the links 33 and 34 slide one relative to the other to permit the roller 29 to contact and press against the coating 24 on the roller 23 and produces the desired nip pressure. With this arrangement, the cylinder 17 is driven, while the rollers 29 and 23 will rotate by reason of their pressure contact with the cylinder 17. With the utilization of the resilient coating 24 on the roller 23, the area of contact between the coating 24 and the cylinder 17 will vary in accordance with the pressure. With thin films of the order of one to four mils, pressures up to sixty pounds per square inch and even higher may be utilized to effect the desired seal. Furthermore, with the use of the resilient coating, minor variations in the surface of the cylinder 17 will be compensated for by the resilience of the coating 24 and thus insure a good seal. With heavier films wherein the total thickness of the two films is of the order of nine mils or greater, it is possible to use a less resilient coating 24 with excellent results though it is important that the coating have a good release factor in order to prevent the film 11 from adhering to the surface. With the use of a single roller 29 for producing the desired nip pressure, the axis of the roller 29 should lie in the plane defined by the axes of the cylinder 17 and the roller 23. It is also evident that when utilizing a cylinder 17 formed of a heavy steel core, it is possible to avoid the use of the roller 29 and connect the piston 35 directly to the link 27. When using the roller 29, however, additional pressure is exerted on the two films while on the embossing roller which further aids in the attainment of good fusion between the two films.

In the use of a temperature controlled cylinder 17, some cooling of the films is effected. It is most desirable, however, to effect adequate cooling of the laminated films prior to removal from the embossing cylinder and for this purpose water jets 17' may be utilized to rapidly cool the laminate. Any suitable cooling gas or liquid, as well as other cooling means, may, of course, be used to effect the same end. The completed material is then removed from the embossing cylinder, passed about a series of cooling rollers 39, 40 and 41, and then guided about a roller 42 and onto a suitable spool 43.

When threading the films 10 and 11 through the apparatus as described above, it is, of course, necessary to move the cylinder 17 away from the roller 23 and the roller 29 away from the cylinder 17. With the arrangement illustrated, as the pistons 35 are operated to move the links 31 to the left, the slidable links 33 and 34 are arranged so that, after the roller 29 moves a short distance from the cylinder 17, the links 33 and 34 will then carry the cylinder 17 away from the roller 23. With the exception of the rollers 29 and 23, all of the heating and cooling rollers in the apparatus are preferably driven at uniform speeds or driven through positive infinitely variable drives in order to maintain uniform tension on the films throughout the entire process, notwithstanding elongation or contraction of the film.

As pointed out above, it is desirable to maintain good temperature control on the surface of the embossing cylinder 17, and this may be attained by forming the cylinder of a material having relatively high heat conductivity, such as aluminum, copper, or the like. If the pressure between the embossing cylinder 17 and the roller 23 is obtained by applying pressure directly to the links 27 supporting the cylinder 17, then the cylinder 17 is preferably formed of a heavy steel drum with suitable means in the axle or shaft for circulating cooling liquid through the steel cylinder. The steel cylinder would then carry an outer shell preferably formed of aluminum, copper or other heat conducting material in which the embossments 18 would be formed together with the suitable internal passages for applying vacuum to each of the embossments. A preferred embodiment of the embossing cylinder 17, however, is shown in FIGURE 2, and is constructed substantially entirely of aluminum.

This preferred cylinder includes a heavy walled cylindrical shell 44 having end walls 45 forming a central chamber 46. Hollow shafts 47 and 48 are fixed to the end walls 45 and carry vacuum valves 47' and 48', respectively. The peripheral wall of the cylinder has a plurality of spaced vacuum passages 49 generally parallel to the axis of the roller, and each of the embossments 18 in the surface is connected to one of the passages 49 by an interconnecting duct 50. Each passage 49 is connected by means of a pair of radially disposed passages 51 to each of the vacuum valves 47' and 48'. With this arrangement, vacuum applied to the valves by the ducts 52 and 53 will withdraw air from the embossments 18 lying within a selected peripheral angle of the cylinder 17. For instance, the valves function so that vacuum is applied to the embossments 18 just prior to their engagement with the film 10, and vacuum is removed from the embossments just prior to the joint at which the finished product is to be removed from the embossing cylinder. In this way, vacuum losses are minimized, and at the same time, the completed product does not have to be removed from the embossing cylinder against the holding effect of the vacuum.

When using a roller of aluminum or other high heat conductive material, the arrangement for obaining the desired nip pressure as described in connection with FIGURE 1 is desirable. In this way, the shafts supporting the embossing cylinder do not need to withstand the forces produced by obtaining the desired nip pressure but in effect need only support the embossing cylinder and effect rotation of it together with the rollers 23 and 29.

While only one embodiment of the invention has been illustrated and described, it is apparent that changes, alterations and modifications may be made without departing from the true scope and spirit thereof as defined by the appended claims.

What is claimed is:

1. The method of making cellular material comprising the steps of embossing a first heated sheet of plastic material having thermoplastic properties, said sheet having been heated on one side to about its fusion temperature, said embodiments extending from the other side of said sheet, reducing the temperature on the other side of said sheet below the embossing temperature immediately after embossment thereof, heating a second sheet of plastic having thermoplastic properties to about the fusion temperature with at least one surface above the fusion temperature, feeding said one side of said second sheet into contact with said one side of said embossed sheet while above the fusion temperature to seal the embossments therein, said one surface of said second sheet transferring heat to said one side of said first sheet to equalize the temperatures of the meeting surfaces of said sheets at a temperature at least equal to the fusion temperature.

2. The method of making a cellular material according to claim 1 including the steps of cooling the other side of said first sheet immediately upon embossment thereof and then cooling said sheets to permanently seal them one to the other.

3. Apparatus for manufacturing cellular material comprising an embossing cylinder of heat conducting material, means for maintaining the surface of heat conducting material, means for maintaining the surface of said cylinder at a selected temperature, means for heating a first plastic sheet having thermoplastic qualities to an embossing temperature just below its fusion temperature, roller means adjoining said embossing cylinder for feeding said sheet onto said cylinder, said roller means being heated to at least maintain the surface of the sheet at about the fusion temperature of the plastic material, means for heating a second thermoplastic sheet to about its fusion temperature with one surface above the fusion temperature, a second roller having a resilient coating bonded thereto for feeding said second sheet onto said embossing cylinder and in overlying pressure relationship with the first said sheet, the last said roller including cooling means to maintain the roller at a temperature to maintain the bond between the coating and the roller and heating means associated with and extending about a portion of the last said roller for heating the outer face of said resilient coating to a relatively high temperature above the fusion temperature of the second sheet whereby said second sheet when passing over the last said roller is maintained at about the fusion temperature of said sheet.

4. Apparatus according to claim 3 wherein said second roller is coated with silicone rubber.

5. Apparatus for manufacturing cellular material according to claim 3 wherein said embossing cylinder is hollow and has a cylindrical wall formed of a high heat conducting material, the outer surface of said wall includes a plurality of depressions therein, means for circulating a temperature controlled liquid through said cylinder to maintain the surface of said cylinder at a selected temperature.

6. Apparatus according to claim 3 wherein the last said heating means is radiant heating means associated with said resiliently coated roller to heat the surface of said resilient coating.

7. Apparatus according to claim 6 wherein said radiant heating means is positioned to heat the surface of said second sheet as it moves over the resilient coating on said roller.

8. Apparatus according to claim 5 wherein said roller having a resilient coating is fixedly mounted, and said apparatus further includes a movable mount for supporting said embossing cylinder and resilient means for urging said embossing cylinder into pressure engagement with said resiliently coated roller.

9. Apparatus according to claim 5 wherein said roller having a resilient coating fixedly mounted, said embossing cylinder is movably mounted, and said apparatus further includes a second roller having a resilient coating on the surface thereof, means movably supporting said second roller and means for urging said second roller into pressure relationship with said embossing cylinder and thereby urging said embossing cylinder into pressure engagement with said roller having a resilient coating thereon.

10. Apparatus according to claim 9 wherein the axis of said resiliently coated roller is coplanar with the axes of said embossing cylinder and the said roller having a resilient coating thereon.

References Cited
UNITED STATES PATENTS

| | | | |
|---|---|---|---|
| 3,208,898 | 9/1965 | Chavannes et al. | 156—498 |
| 3,285,793 | 11/1966 | Chavannes | 156—210 |
| 2,771,388 | 11/1956 | Rocky et al. | 156—242 XR |

PHILIP DIER, *Primary Examiner.*

U.S. Cl. X.R.

156—311, 498, 553